United States Patent

Zancho et al.

[11] Patent Number: 5,999,797
[45] Date of Patent: Dec. 7, 1999

[54] METHOD AND APPARATUS FOR PROVIDING PRIVATE GLOBAL NETWORKS IN A SATELLITE COMMUNICATION SYSTEM

[75] Inventors: William Frank Zancho, Hawthorn Woods, Ill.; James William Bishop, Jr.; Michael William Krutz, both of Chandler, Ariz.

[73] Assignee: Motorola, Inc., Schaumburg, Ill.

[21] Appl. No.: 08/963,544

[22] Filed: Nov. 3, 1997

[51] Int. Cl.⁶ ................................................ H04B 7/185
[52] U.S. Cl. ................... 455/12.1; 455/13.1; 455/67.3; 370/316
[58] Field of Search ................... 455/12.1, 13.1, 455/427, 428, 429, 430, 67.3, 522, 505, 405, 445, 456, 458; 370/318, 331, 316, 320

[56] References Cited

U.S. PATENT DOCUMENTS

| | | | |
|---|---|---|---|
| 4,982,421 | 1/1991 | Kirsch et al. | 379/216 |
| 4,993,014 | 2/1991 | Gordon | 370/16 |
| 5,404,394 | 4/1995 | Dimolitsas et al. | 455/12.1 |
| 5,430,729 | 7/1995 | Rahnema | 270/94.1 |
| 5,490,087 | 2/1996 | Redden et al. | 364/514 |
| 5,594,780 | 1/1997 | Wiedeman et al. | 379/59 |
| 5,655,005 | 8/1997 | Wiedeman et al. | 370/320 |
| 5,724,414 | 3/1998 | Dimolitsas et al. | 455/12.1 |
| 5,826,169 | 10/1998 | Natarajan | 455/13.1 |
| 5,887,257 | 3/1999 | Olds | 455/427 |
| 5,920,803 | 7/1999 | Tayloe | 455/12.1 |

OTHER PUBLICATIONS

FCC Application of Motorola Satellite Systems, Inc. for Authority to Construct, Launch and Operate The M–Star System; Sep. 4, 1996.

*Primary Examiner*—Wellington Chin
*Assistant Examiner*—Pablo N. Tran
*Attorney, Agent, or Firm*—Sherry J. Whitney; James E. Klekotka

[57] ABSTRACT

Private Global Networks (PGNs) between communication terminals (110, 114, 116, 118) are established within a satellite communication system (100). Each PGN provides to its users a network of dedicated communication paths which have durations that exceed the duration of a particular call. A dedicated communication path is established by determining (416, 424) hand-off schedules for satellite-to-terminal links for both a source and destination terminal, and also by determining (428) satellite cross-link schedules necessary to maintain the dedicated path for a duration which exceeds the duration of a particular call.

21 Claims, 4 Drawing Sheets

METHOD AND APPARATUS FOR PROVIDING PRIVATE GLOBAL NETWORKS IN A SATELLITE COMMUNICATION SYSTEM

FIELD OF THE INVENTION

This invention relates generally to satellite communications and, more particularly, to a method and apparatus for providing dedicated communication paths through a satellite communication system.

BACKGROUND OF THE INVENTION

Large, multi-satellite constellation systems are expensive to build and place into orbit. Because of the expense, it is desirable to fully utilize the space-based resources to provide revenue producing communication services to users and to minimize the amount of resources that are not providing services to users.

A "satellite" is defined herein to mean a man-made object or vehicle intended to orbit Earth and includes both geostationary and non-geostationary satellites. A "constellation" is defined herein to mean an ensemble of satellites arranged in orbits for providing specified coverage of a portion or all portions of the Earth. A constellation typically includes multiple rings (or planes) of satellites and can have equal numbers of satellites in each plane, although this is not essential. A constellation could include geostationary or non-geostationary satellites, or a combination of both.

A "call" is defined herein as a limited data transfer session having a beginning and an end between two communication units. A call could be, for example, a phone call, a facsimile transmission, or an electronic file transfer between two communication units. A "communication unit" could be, for example, a wireless or wireline telephony device, a facsimile machine, or a computer or other data terminal. In prior-art systems, each time a call is setup between communication units, a call setup procedure is performed during which a communication path is established between the units. When the data transfer is complete, the communication path is relinquished, or torn down.

Call setup procedures utilize resources in the system. Each call set-up procedure involves an exchange of messages between the initiating communication unit and the system, and between the system and a termination communication unit. These call set-up messages generate communication traffic which is non-revenue bearing in nature. A certain portion of system capacity must be allocated for these non-revenue bearing processes.

In prior art systems, communication resources are put into service based on predicted utilization from a number of users located around the world. Because the predictions, by their nature, are somewhat inaccurate to describe actual demand, some system resources are under utilized when system resources are allocated according to the predictions. Allocating system resources based on predictions and in order to respond to each call request can be costly to the system and can result in a large amount resources being consumed by non-revenue bearing information. In addition, performing call setup procedures between communication units for each data transfer session increases the time required to communicate the information.

What are needed are a method and apparatus for more efficiently using system resources by allocating system resources to users on a longer-duration basis.

DETAILED DESCRIPTION OF THE DRAWINGS

Figure 1:
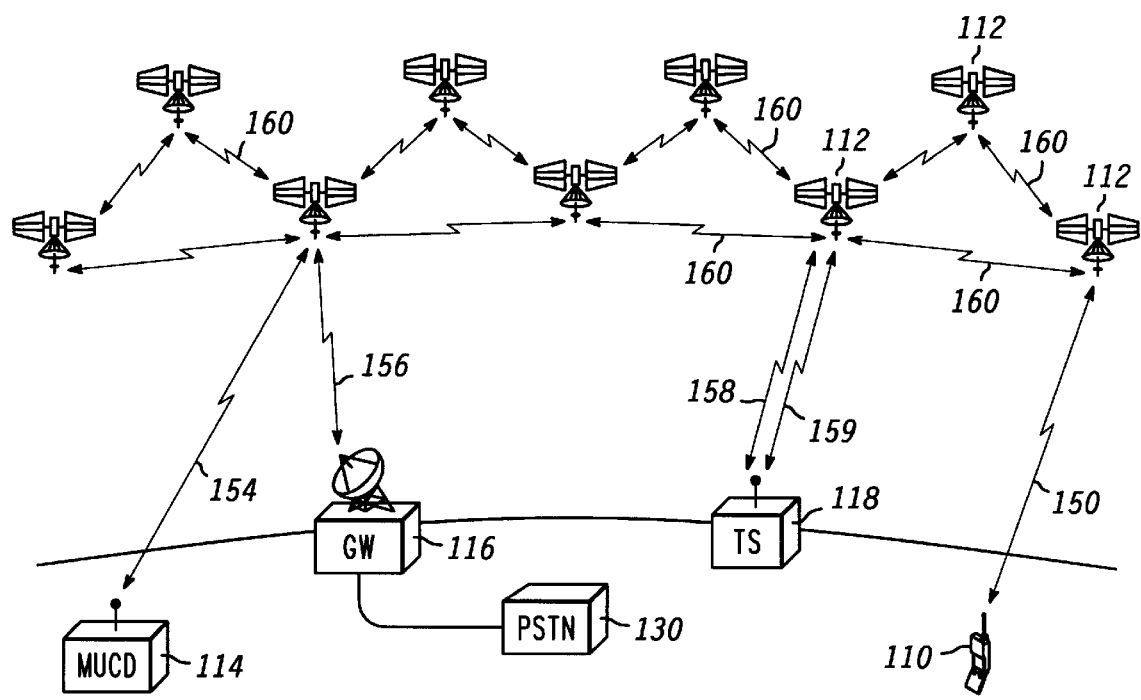
FIG. 1 shows a simplified block diagram of a satellite communication system within which the method and apparatus of the present invention could be practiced in accordance with a preferred embodiment of the present invention.

The method and apparatus of the present invention provide Private Global Networks (PGNs) within a communication system. Each PGN provides to its users a network of dedicated communication paths which could provide a guaranteed level of data throughput over a length of time which exceeds the duration of a particular call. This gives the users the ability to communicate multiple sets of data between nodes in the PGN without the need to perform a call setup procedure to transfer each set of data. In other words, a dedicated path is maintained between a pair of terminals even though no data is being transferred at a particular time. In a preferred embodiment, this is implemented in a system having a constellation of non-geosynchronous satellites and a number of substantially stationary terrestrial-based communication terminals.

As used herein, a "dedicated path" is a path which is established between two terminals through the communication system, and which is continuously maintained through the communication system for a duration which exceeds the duration of a single call. By providing such dedicated paths, the method and apparatus of the present invention eliminates the necessity for establishment and relinquishment of a communication channel each time a call is made between two terminals. This provides the advantages of expediting initiation of data transfer sessions and also eliminates substantial amounts of non-revenue bearing data transfers through the system. In addition, users of a PGN can enjoy dedicated bandwidth which ensures that they will be able to transfer data between PGN terminals when desired.

Because the topology of a satellite communication system is constantly changing, maintenance of a dedicated path involves satellite-to-terminal hand-offs and the establishment and relinquishment of various inter-satellite crosslinks or bent-pipe links.

The method and apparatus of the present invention provides dedicated, broad or narrow-band communications paths between two or more terminals. For example, the method and apparatus of the present invention would enable a multi-national corporation to maintain dedicated communication paths between corporate headquarters and any or all of the corporation's remote offices, outlet stores, or franchises.

The present invention is applicable to satellite communication systems that have earth-fixed, satellite-fixed, or both types of communication cells. Also, the present invention is applicable to satellite communication systems having one or more satellites in both a non-geosynchronous orbit and a geosynchronous orbit around earth. A constellation of satellites implementing the method and apparatus of the present invention could include any number of satellites. The present invention is applicable to satellite communication systems having satellites which orbit the earth at any altitude or angle of inclination, including polar, equatorial, inclined or other orbital patterns. The present invention is applicable to systems providing full coverage of the earth, partial coverage, and/or multiple coverage of portions of the earth.

In a preferred embodiment, multiple separate frequency bands are supported by the satellites. In a preferred embodiment, two frequency bands are supported, where the first frequency band is within an L-band range. The second frequency band is within a K-band range. As will be described below, some system data is transmitted and received using L-band carrier signals, and other system data is transmitted and received using K-band carrier signals.

In a preferred embodiment, the provision of PGN services is controlled by a system control center. In some cases, PGNs will be established automatically by the system control center. In other cases, communication system users can request PGN services. That is, users can submit requests to have PGNs established for them. The system control center evaluates the request and determines if adequate system resources are available. The control center could be a centralized or a dispersed control function. For example, the control center could be located in a dedicated control facility or a system gateway. Alternatively, functions performed by the control center could be dispersed throughout the system. In such an embodiment, control facilities, gateways, satellites, and other devices all could participate in providing the control function. Establishment of a PGN will be described in detail in conjunction with FIG. 4, below.

FIG. 1 shows a simplified block diagram of a satellite communication system within which the method and apparatus of the present invention could be practiced. Satellite communication system 100 includes communication satellites 112 and a number of different types of communication terminals. Communications terminals include, for example, single user fixed or mobile communication devices 110, multi-user communication devices 114, gateways 116, and terrestrial stations 118. Single user communication devices 110, multi-user communication devices 114, gateways 116, terrestrial stations 118, and communication satellites 112 are also described herein as "nodes" of satellite communication system 100.

Single user communication devices 110 communicate with communication satellites 112 using radio frequency (RF) communication links 150. Multi-user communication devices 114 communicate with communication satellites 112 using RF communication links 154. Gateways 116 communicate with communication satellites 112 using RF communication links 156. Terrestrial stations 118 communicate with communication satellites 112 using RF communication links 158 and 159.

Links 150, 154, and 159 utilize a limited portion of the electromagnetic spectrum, typically in the L-Band frequency range (referred to herein as band #1), that is divided into numerous channels. Channels supported on links 150, 154, and 159 can use Frequency Division Multiple Access (FDMA), and/or Time Division Multiple Access (TDMA), and/or Code Division Multiple Access (CDMA) communications techniques or combinations thereof.

Links 150, 154, and 159 desirably include one or more broadcast channels. Terminals 110, 114, and 118 can synchronize with and monitor at least one broadcast channel to detect data messages which are addressed to them. Terminals 110, 114, and 118 can transmit messages to communication satellites over one or more acquisition channels provided within links 150, 154, and 159. Broadcast channels and acquisition channels are not dedicated to any one user but are shared by all users currently within view of a satellite 112.

Links 156 and 158 support numerous communications channels at higher frequencies (e.g., K-Band, referred to herein as band #2). Channels supported on links 156 and 158 also can use Frequency Division Multiple Access (FDMA), and/or Time Division Multiple Access (TDMA), and/or Code Division Multiple Access (CDMA) communications techniques or combinations thereof. Those skilled in the art will recognize that any of links 150, 154, 156, 158, and 159 can be unidirectional in either direction or bi-directional.

Communication satellites 112 are responsible for routing data packets through the system. In a preferred embodiment, communication satellites 112 communicate with other communication satellites 112 using crosslinks 160. Via these crosslinks 160, data from terrestrial-based communication terminals 110, 114, 116, 118 located at any point on or near the surface of the earth can be routed through satellites 112 of the constellation to within range of substantially any other point on the surface of the earth. In alternate embodiments, satellites 112 could communicate with each other using bent-pipe links.

Communication terminals 110, 114, 116, and 118 can be located anywhere on the surface of the earth or in the atmosphere above the earth. Single user communication devices 110 are preferably communications terminals which transmit data to and receive data from communication satellites 112. By way of example, single user communication devices 110 can be hand-held, portable cellular telephones adapted to communicate with communication satellites 112 via uplinks and downlinks.

Multi-user communication devices 114 are preferably communications terminals which are used by a group of PGN users to transmit data to and receive data from communication satellites 112. MUCDs 114 preferably simultaneously transmit data to and receive data from communication satellites 112 on multiple channels within uplinks and downlinks. MUCDs 114 can perform call-processing tasks, hand-off tasks, and registration tasks in conjunction with establishing uplinks and downlinks with communication satellites 112. In a preferred embodiment, diverse terrestrial-based mobile and fixed local networks could access a PGN in communication system 100 through MUCDs 114.

Gateways 116 also communicate with satellites 112 over uplinks and downlinks. Gateways 116 typically perform system level functions, such as providing satellite signaling commands to satellites 112. Gateways 116 can be additionally responsible for receiving voice and/or data from satellites 112.

Via gateway 116, terrestrial-based communication terminals 110, 114, 118 can be in data communication with other communication devices dispersed throughout the world through public switched telephone networks (PSTN) 130 and/or communication devices which communicate through conventional terrestrial base stations (e.g., terrestrial cellular telephones).

Terrestrial stations 118 can be single user or multi-user facilities. For example, terrestrial stations 118 can be private gateways. Such a private gateway could be used to provide communications within a major facility, for example. Terrestrial stations 118 could also be coupled to other terrestrial-based communication systems.

In accordance with a preferred embodiment of the present invention, pairs of terminals in the communication system are coupled together through dynamic, dedicated communication paths to form a PGN. Through the dedicated communication paths, terrestrial-based communication terminals 110, 114, 116, 118 can privately and without interruption communicate with other terrestrial-based communication terminals 110, 114, 116, 118 without having to perform a complete call setup procedure for each call. The below-discussed features of a preferred embodiment of the present invention can be practiced using any number of terrestrial-based communication terminals 110, 114, 116, 118 within satellite communication system 100.

In a preferred embodiment, communication satellites 112 reside in non-geostationary orbits. In non-geostationary orbits, satellites 112 can move at high speeds relative to any given point on the surface of the earth. Because of the relative movement between the communication satellites and communication terminals, each satellite-to-terminal communication link is a temporary one. In accordance with a preferred embodiment, hand-off schemes are employed to realize a continuous dedicated path.

For illustration purposes only, FIG. 1 shows a limited number of satellites 112, one single user communication device 110, one multi-user communication device 114, one gateway 116, and one terrestrial station 118. A system incorporating the method and apparatus of the present invention could have any number of satellites 112, a plurality of single user communication devices 110, a plurality of multi-user communication devices 114, a plurality of gateways 116, and a plurality of terrestrial stations 118. In addition, such a system could support numerous other communication units of various types and degrees of mobility.

Figure 2:
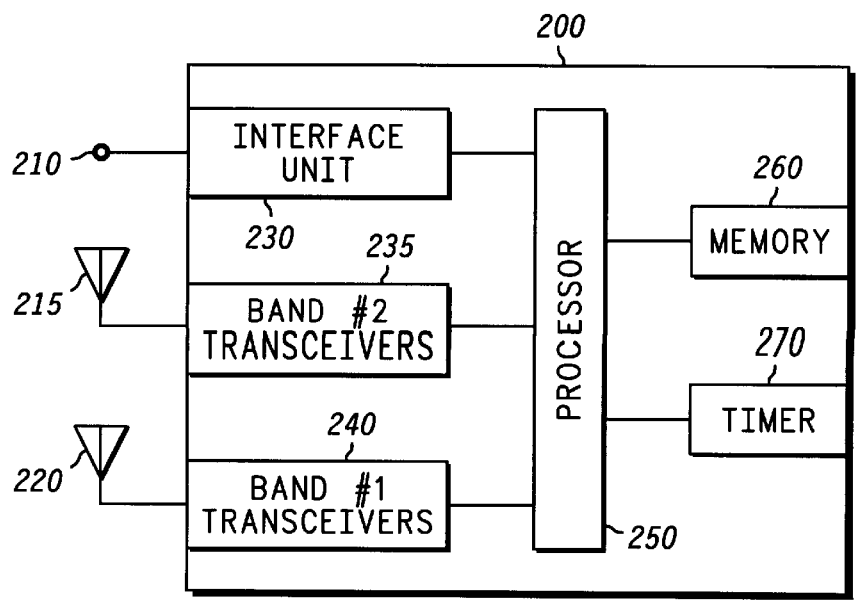
FIG. 2 shows a simplified block diagram of a communication terminal in accordance with a preferred embodiment of the present invention.

FIG. 2 illustrates a simplified block diagram of a generalized communication terminal 200 in accordance with a preferred embodiment of the present invention. Generalized communication terminal 200 can represent single user communication device 110, multi-user communication device 114, gateway 116, or terrestrial station 118 (FIG. 1).

In a preferred embodiment, when terminal 200 is a single user communication device or a multi-user communication device (e.g., devices 110, 114, FIG. 1), terminal 200 includes antenna 220, band #1 transceivers 240, interface port 210, interface unit 230, processor 250, memory device 260, and timer 270.

Antenna 220 is used to establish links with satellites 112 (FIG. 1). Antenna 220 is coupled to band #1 transceivers 240. In the receive mode, band #1 transceivers 240 perform the functions of frequency down-conversion, filtering, and demodulation to obtain digital data which is sent to processor 250. In the transmit mode, band #1 transceivers 240 perform the functions of frequency up-conversion, filtering, amplification, and modulation.

When communication terminal 200 is a single-user communication device (e.g., unit 110, FIG. 1), only a single antenna 220 and band transceiver 240 are typically present. When communication terminal 200 is a multi-user communication device (e.g., unit 114, FIG. 1), a number of antennas 220 and band transceivers 240 are typically present. In alternate embodiments, terminal 200 could have any number of antennas and band transceivers.

When communication terminal 200 is a gateway (e.g., gateway 116, FIG. 1), terminal 200 includes band #2 transceivers 235 and antenna 215 in lieu of band #1 transceivers 240 and antenna 220. A number of antennas 215 and band #2 transceivers 235 are typically present. Antennas 215 and band #2 transceivers perform similar functions as antennas 220 and band #1 transceivers 240.

When communication terminal 200 is a terrestrial station (e.g., terrestrial station 118, FIG. 1), terminal 200 includes both antennas 215, 220 and band transceivers 235, 240. A number of antennas 215, 220 and band transceivers 235, 240 are typically present.

Processor 250 desirably carries out some portions of the method of the present invention, described below. Processor 250 generally controls and manages system and user access for communication terminal 200, message reception and transmission, channel set-up, radio tuning, frequency, time slot, and/or code assignment, and other communication and control functions. This could include procedures for protocols for dedicated path establishment and maintenance and other associated functions as described below. In addition to performing other tasks as appropriate, processor 250 desirably stores results from such procedures in memory device 260.

Timer 270 synchronizes with a system time which is known by multiple nodes of communication system 100. Timer 270 is used to coordinate operations performed by communication terminal 200 with other devices within the system. Furthermore, data from timer 270 could also be used to time-stamp data generated by terminal 200.

Interface port 210 is used to communicate with other systems or subsystems. For example, additional subsystems can be used to provide a backup or redundant data transmission path. In other cases, subsystems can provide user inputs and outputs. Interface unit 230 is coupled to interface port 210 and is used to perform interface functions. Interface unit 230 is coupled to processor 250. Processor 250 sends digital data to interface unit 230 and receives digital data from interface unit 230.

For clarity and ease of understanding, FIG. 2 illustrates two antennas 215, 220 and associated band transceivers 235, 240, one processor 250, one interface port 210, one interface unit 230, one memory device 260, and one timer 270. In alternate embodiments, any number of these components could be used. The number of antennas 215, 220 and band transceivers 235, 240, for example, depends on the number of bands within which communications are to be provided.

Figure 3:
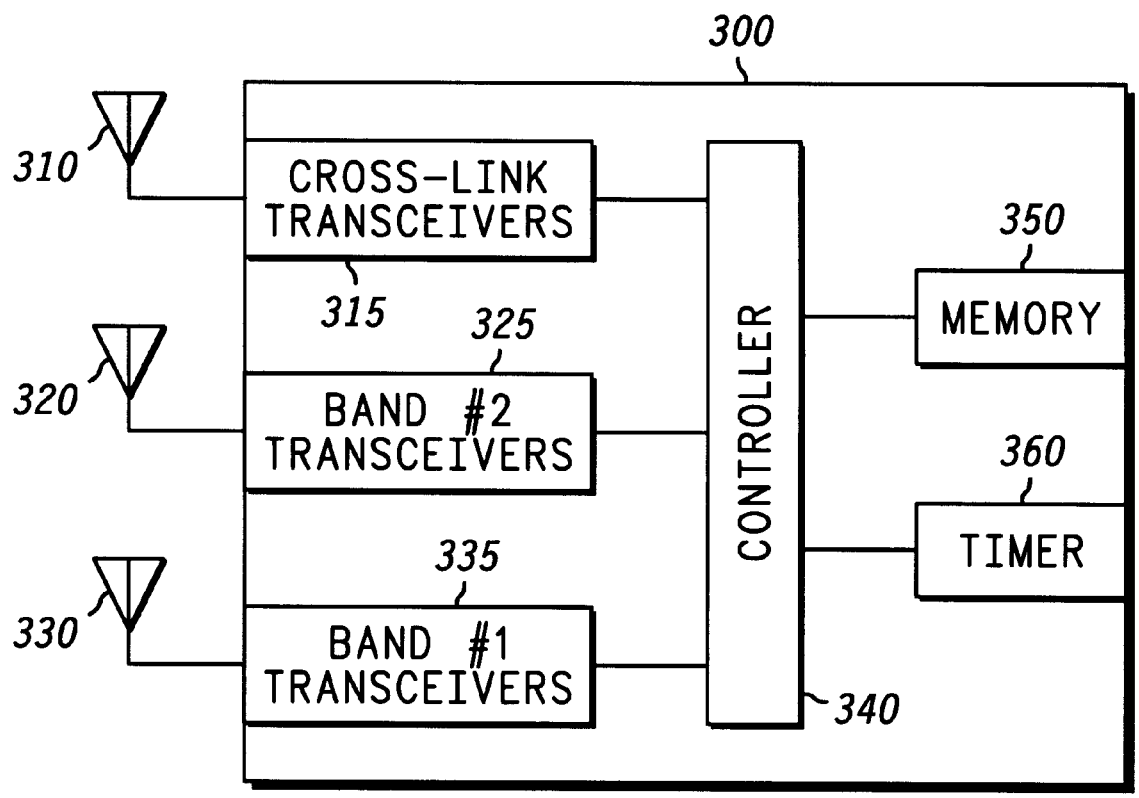
FIG. 3 shows a simplified block diagram of a satellite in accordance with a preferred embodiment of the present invention.

FIG. 3 illustrates a simplified block diagram of a satellite 300 in accordance with a preferred embodiment of the present invention. Preferably, many or all satellites 300 within system 100 (FIG. 1) include equipment as illustrated by the block diagram of FIG. 3. Satellite 300 includes cross-link transceivers 315, band transceivers 325, 335, antennas 310, 320, 330, controller 340, memory device 350, and timer 360.

Transceivers 315 and antennas 310 support cross-links to other in-range satellites 112. Band #2 transceivers 325 and associated antennas 320 support band #2 links with communications terminals (e.g., gateways 116 and terrestrial stations 118, FIG. 1). Band #1 transceivers 335 and associated antennas 330 support band #1 links with communications terminals (e.g., single and multi-user devices 110, 114, and terrestrial stations 118, FIG. 1). Preferably, each satellite 112 could simultaneously support a number of band #2 links and many band #1 links with communications terminals.

Controller 340 is coupled to each of transceivers 315, 325, and 335 as well as to memory device 350 and timer 360. Controller 340 could be implemented using one or more processors. Controller 340 uses timer 360 to monitor and to maintain, among other things, knowledge of a synchronized system time. Memory device 350 stores data that serve as instructions to controller 340 and that, when executed by controller 340, cause satellite 300 to carry out particular aspects of the method of the present invention, as will be discussed in detail below. In addition, memory device 350 desirably includes variables, tables, and databases that are manipulated during the operation of satellite 300.

Satellite 300 can receive data packets via any one of transceivers 315, 325, and 335. After receipt of a data packet, controller 340 determines the data packet destination and determines how to route the packet. In a preferred embodiment, the routing decision depends on routing tables stored in memory device 350 and/or on the data packet type.

For clarity and ease of understanding, FIG. 3 illustrates one controller 340, one memory device 350, one timer 360, one crosslink antenna 310 and associated transceiver 315, one band #2 antenna 320 and associated transceiver 325, and one band #1 antenna 330 and associated transceiver 335. In alternate embodiments, any number of these components could be used. The number of antennas 310, 320, 330 and transceivers 315, 325, 335, for example, depends on the number of bands within which communications are to be provided and the number of terminals that satellite 300 communicates with.

Figure 4:
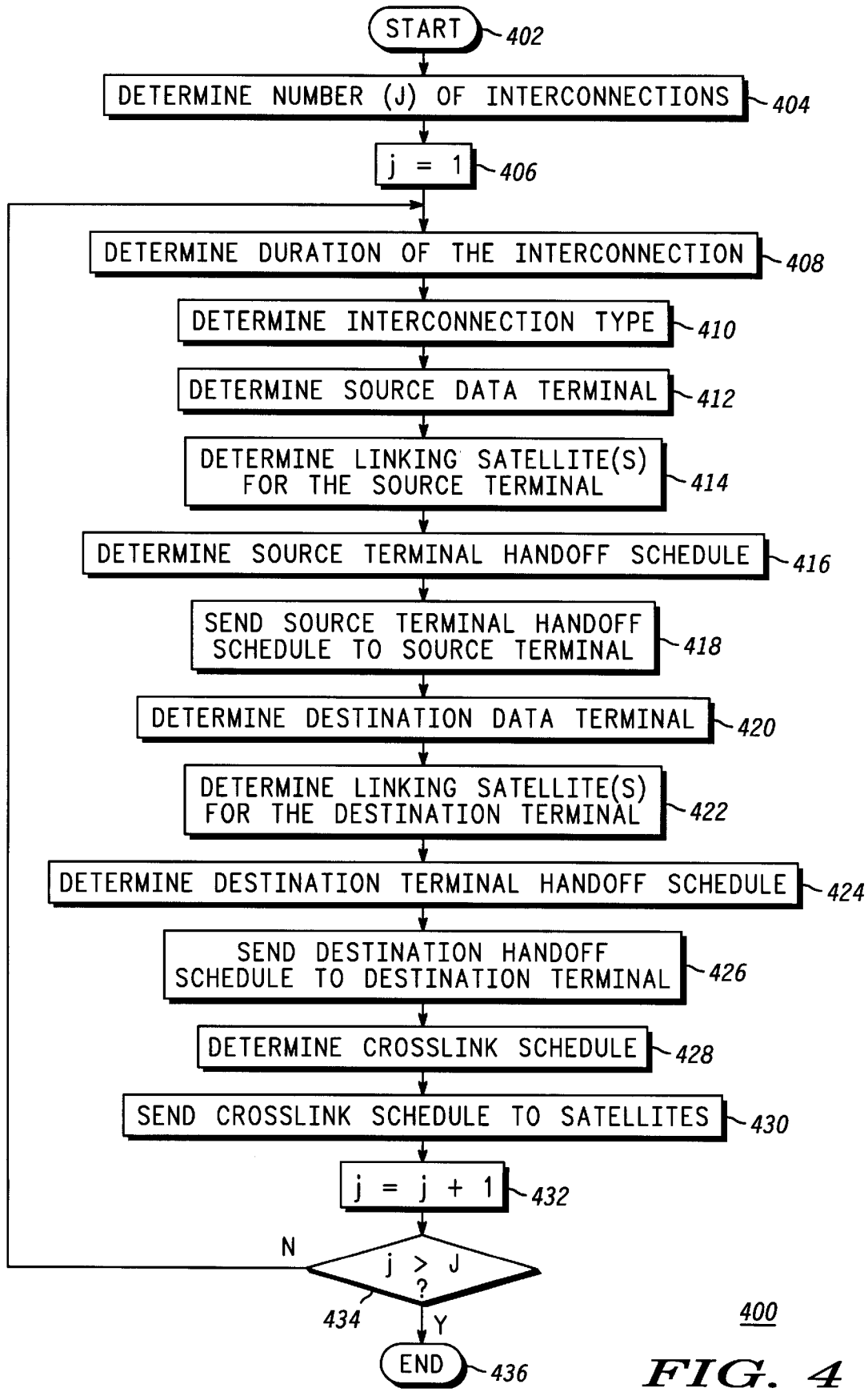
FIG. 4 illustrates a flowchart of a method for establishing a Private Global Network (PGN) within a satellite communication system in accordance with a preferred embodiment of the present invention.

FIG. 4 illustrates a flowchart of a method for establishing a PGN within a satellite communication system in accordance with a preferred embodiment of the present invention. Procedure 400 starts with step 402. Initiation of the procedure can be the result of a communication system user requesting a PGN to be established or initiation can be the result of a system command to set up a PGN.

In step 404, the number, J, of dedicated paths (i.e., interconnections between terminals) that are required for this particular PGN are determined. The number of paths could be numerous or could be as few as one path. For example, a business user might request that a single dedicated path be established between a foreign and domestic office. Or, a multi-national corporation having numerous outlet stores could request that the PGN include dedicated paths between corporate headquarters and each outlet store. PGN sizes and complexity levels can vary widely. In addition, some PGN requirements could change based on the time of day or other user preferences. For example, the multi-national corporation might periodically establish and relinquish the dedicated paths to its outlet stores based on the stores' hours of operation. In short, the number of paths could be temporal, and is determined from the number of terminals that are interconnected within in the PGN.

In step 406, a counting variable, j, is initialized to one. The counting variable is the variable that is used to control iterations of the procedure to establish the number of dedicated paths desired within the PGN. For each dedicated path desired, steps 408 through 434 are performed in a preferred embodiment. In alternate embodiments, steps 408 through 434 could be performed in different orders or in parallel. In addition, although FIG. 4 illustrates an iterative loop, calculations for each dedicated path could be performed in parallel as well.

In a preferred embodiment, step 408 is performed, in which the duration for the jth dedicated path is determined. For example, a path establishment and relinquishment times for the jth path could be determined. The path establishment and relinquishment times could be absolute times, for example, or they could indicate times of day for periodic establishment and relinquishment of the dedicated path. In other words, a dedicated path duration could include at least one periodic segment.

In an alternate embodiment, only path establishment time could be calculated and the dedicated path could continue to be maintained indefinitely. In either embodiment, the method of the present invention is used to establish a dedicated path which has a duration that exceeds the duration of a single call.

In step 410, the type of path is determined. Path types can be low data rate or high data rate, for example, and they could be unidirectional or bi-directional. In a preferred embodiment, low data rate connections are established using L-Band (i.e., band #1) carriers, and high data rate paths are established using K-Band (i.e., band #2) carriers.

In step 412, the identity and location of the source communication terminal for the jth path is determined. In a preferred embodiment, the terminal's capabilities and status are also determined. For purposes of example, a source communication terminal could be located at a corporate headquarters office.

In step 414, satellites which can provide communication links with the source communication terminal are determined for, either, the duration of the jth path or for a portion of the duration. Desirably, system topology is predicted to determine the best beams and satellites to use for the satellite-to-source-terminal links. Loading predictions or schedules are also examined to determine if hand-offs will have to be made to ensure that the dedicated path is maintained.

In step 416, a source terminal hand-off schedule is determined based on information derived in step 414. The source terminal hand-off schedule describes the hand-offs (e.g., link establishment times, pointing angles, etc.) between the source communication terminal and the linking satellites. If the duration of the dedicated path will exceed the duration of the source communication unit's ability to communicate with a single satellite, hand-offs would be necessary to maintain the dedicated path. In a preferred embodiment, both L-Band and K-Band terminals perform hand-offs from one satellite to another. In the case of the L-Band terminals, hand-offs are also performed between beams on a single satellite.

In a preferred embodiment, step 418 is then performed, during which the hand-off schedule is sent to the source communication terminal. In alternate embodiments, the hand-off process could be transparent to the source communication terminal and knowledge of the hand-off schedule would not be needed. In such embodiments, the linking satellites could control hand-off and the hand-off schedule could be sent to those satellites.

In step 420, the identity and location of the destination communication terminal for the jth path is determined. The source communication terminal and the destination communication terminal together form a "pair" of terminals for which a dedicated path will be established. In a preferred embodiment, the terminal's capabilities and status are also determined. For purposes of example, a destination communication terminal could be located at one of the corporation's outlet stores or franchises.

In step 422, satellites which can provide communication links with the destination terminal are determined for, either, the duration of the jth path or for a portion of the duration. Similar to step 414, system topology is predicted to determine the best beams and satellites to use for the satellite-to-destination-terminal link. Loading predictions or schedules are also examined to determine if hand-offs will have to be made to ensure that the dedicated path is maintained.

In step 424, a destination terminal hand-off schedule is determined based on information derived in step 422. The destination terminal hand-off schedule describes the hand-offs (e.g., link establishment times, pointing angles, etc.), if any, between the destination communication terminal and the linking satellites.

In a preferred embodiment, step 426 is then performed, during which the hand-off schedule is sent to the destination communication terminal. In alternate embodiments, the hand-off process could be transparent to the destination communication terminal and knowledge of the hand-off schedule would not be needed. In such embodiments, the linking satellites could control hand-off and the hand-off schedule could be sent to those satellites.

In step 428, cross-link schedules are determined which include information which the linking satellites, and any intermediate satellites between the source and destination linking satellites, will use to maintain the dedicated path for a duration of the jth path or a portion of that duration. As the satellites move with respect to the source and destination terminals and also with respect to other satellites, different cross-links will, of necessity, need to be established in order to maintain the dedicated path between the source and destination terminal. A prediction of system topology during the duration of the dedicated path, or a portion thereof, is used to determine the satellite cross-links.

In step 430, the cross-link schedules are sent to the satellites. The satellites will use the cross-link schedules to control cross-link establishment and relinquishment necessary to maintain the jth dedicated path. In some scenarios, no intermediate satellites might be necessary between the source linking satellite and the destination linking satellite. In other scenarios, the source linking satellite and the destination linking satellite could be the same satellite. In any of those scenarios, the calculation and distribution of the cross-link schedules would be substantially simplified.

In step 432, the counting variable, j, is incremented by one, in order to set up the procedure for the next iteration (i.e., for the next dedicated path calculations).

In step 434, the counting variable, j, is compared to the total number, J, of dedicated paths which are to be established for this particular PGN. When there are additional paths, procedure 400 branches to step 408, and procedure 400 iterates as shown in FIG. 4. When all of the paths have been examined, then procedure 400 branches to step 436 and ends.

As described above, in a preferred embodiment, satellites receive data from other satellites via crosslinks. In alternate embodiments, the method and apparatus of the present invention could be implemented in a system where satellites transfer data between themselves using "bent-pipe" links. In such embodiments, the crosslink schedules described in conjunction with FIG. 4 would describe bent-pipe links rather than direct links between satellites.

In accordance with the method and apparatus of the present invention, satellites cooperate to maintain dedicated paths even when user data is not flowing across a particular dedicated path in the PGN. When user data is not flowing on a satellite-to-terminal link, the available bandwidth could be used to exchange system control and/or link maintenance data relevant to the communication terminal. Link maintenance data, for example, could be used to determine link quality and perform bit error checking.

Figure 5:
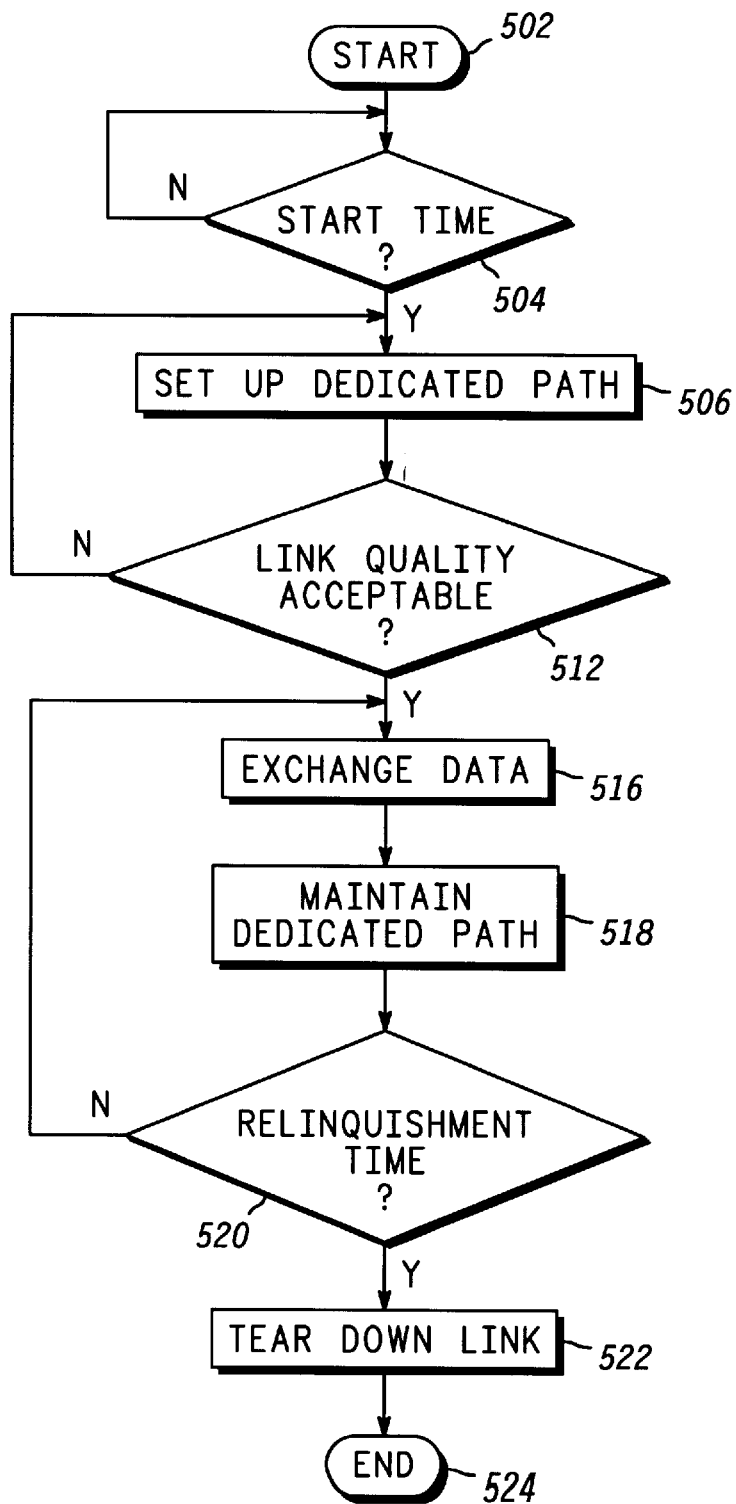
FIG. 5 illustrates a flowchart of a method for establishing and maintaining a dedicated communication path within a PGN system in accordance with a preferred embodiment of the present invention.

FIG. 5 illustrates a flowchart of a method for establishing and maintaining a dedicated communication path within a PGN system in accordance with a preferred embodiment of the present invention. Procedure 500 starts with step 502. Procedure 500 could be initiated upon terminal power up, and/or could be initiated at periodic intervals. Alternatively, procedure 500 could be initiated when a communication system user requests a PGN to be established, or it could be initiated as a result of a system command to set up a PGN.

In step 504, a determination is made whether a path establishment time for establishment of a dedicated path is reached. In a preferred embodiment, satellites and/or communication terminals store operational schedules and monitor the system time to determine when they are to begin establishment of a dedicated path.

In step 506, a dedicated path is established between the source and destination communication terminals in accordance with information derived as described in conjunction with FIG. 4. Dedicated path establishment could be performed in a similar manner to call setup procedures currently known by those of skill in the art.

Dedicated path setup could include steps performed for the purpose of determining path quality. For example, the source communication terminal could transmit a known initiation bit pattern to the destination communication terminal, the destination communication terminal could receive the initiation bit pattern and transmit a confirmation bit pattern to the source communication terminal. The confirmation bit pattern could include, for example, the results of a quality check performed by the destination communication terminal on the initiation bit pattern.

In a preferred embodiment, step 512 is performed, during which a check is performed to determine link quality. If the link quality is unacceptable, then the procedure could branch back to step 504, and an alternate dedicated path could be established. The system could continue to attempt alternate dedicated paths for a number of iterations, or until a path having an acceptable quality is established.

When the quality check indicates that the link quality is within acceptable limits, procedure 500 branches to step 516 where the source and destination communication terminals begin exchanging data over the dedicated path.

In step 518, the source communication terminal, destination communication terminal, and satellites perform the functions necessary to maintain the dedicated path for the desired duration of the dedicated path. These functions include, but are not limited to, performing hand-off procedures between terminals and satellites, cross-link establishment and relinquishment, and link quality assessment procedures. In a preferred embodiment, hand-off and crosslink establishment and relinquishment procedures are governed by hand-off schedules determined in accordance with the method described in conjunction with FIG. 4. In an alternate embodiment, hand-off and crosslink establishment procedures could be performed in real-time after dedicated path establishment.

In step 520, a determination is made whether the path relinquishment time is reached. The path relinquishment time could be the end of the predetermined duration of the dedicated path, for example, or it could be the end of a repetitive period during which the dedicated path is to be maintained. If the path relinquishment time for the dedicated path has not been reached, then procedure 500 branches to step 516 and iterates as shown in FIG. 5. When the path relinquishment time is reached, then the path is torn down in step 522, and procedure 500 branches to step 524 and ends.

In summary, the method and apparatus of the present invention enable Private Global Networks (PGNS) to be established within a satellite communication system. PGNs allow users to enjoy guaranteed data throughput via dedicated paths between communication terminals. In a preferred embodiment, the satellite communication system includes Low Earth Orbit (LEO) satellites. While the principles of the invention have been described above in connection with specific apparatus, it is to be clearly understood that this description is made only by way of example and not as a limitation on the scope of the invention.

For example, although the description describes a system using LEO satellites, Medium-Earth Orbit (MEO) satellites or satellites in other orbits could also or alternatively be used. Any combination of satellites in different orbits could be used for establishment and maintenance of a PGN. In addition, the sequence and serial execution format of the method steps described in conjunction with FIGS. 4 and 5 could be modified into other sequences and to parallel execution formats while providing substantially equivalent results in accordance with the present invention. These and other changes and modifications which are obvious to those skilled in the art are intended to be included within the scope of the present invention.

What is claimed is:

1. A communication system comprising:
    a first communication terminal;
    a second communication terminal, said first communication terminal and said second communication terminal forming a first pair; and
    a plurality of non-geosynchronous satellites which are capable of maintaining a first dedicated communication path between said first pair, said first dedicated communication path having a first duration which exceeds a length of time of a first data transfer session between said first communication terminal and said second communication terminal, wherein maintaining said first dedicated communication path involves performing hand-offs of said first communication terminal and said second communication terminal during said first duration.

2. The communication system as claimed in claim 1 further comprising:
    a third communication terminal; and
    a fourth communication terminal, said third communication terminal and said fourth communication terminal forming a second pair,
    wherein said plurality of non-geosynchronous satellites are capable of maintaining a second dedicated communication path between said second pair, said second dedicated communication path having a second duration which exceeds a length of time of a second data transfer session between said third communication terminal and said fourth communication terminal, wherein maintaining said second dedicated communication path involves performing hand-offs of said third communication terminal and said fourth communication terminal during said second duration.

3. The communication system as claimed in claim 1, wherein said first duration begins at a path establishment time.

4. The communication system as claimed in claim 3, wherein said first duration is defined by said path establishment time and ends at a path relinquishment time.

5. The communication system as claimed in claim 1, wherein said first duration includes at least one periodic segment.

6. The communication system as claimed in claim 1, wherein said plurality of non-geosynchronous satellites are further capable of establishing and relinquishing crosslinks between each other as necessary to maintain said first dedicated communication path during at least a portion of said first duration.

7. The communication system as claimed in claim 1, wherein said plurality of non-geosynchronous satellites are further capable of establishing and relinquishing bent-pipe links between each other as necessary to maintain said first dedicated communication path during at least a portion of said first duration.

8. The communication system as claimed in claim 1, wherein said first dedicated communication path includes more than one of said plurality of non-geosynchronous satellites during at least a portion of said first duration.

9. In a satellite communication system which comprises a plurality of non-geosynchronous satellites, a method for establishing communication links between communication terminals comprising said steps of:
    identifying a first dedicated path between a first communication terminal and a second communication terminal, wherein said first dedicated path includes links supported by at least one of said plurality of non-geosynchronous satellites;
    determining a duration for said first dedicated path, wherein said duration exceeds a length of time of a first data transfer session between said first communication terminal and said second communication terminal;
    establishing said first dedicated path at a start time of said duration; and
    maintaining said first dedicated path for said duration.

10. The method as claimed in claim 9, wherein said establishing step further comprises said steps of:
    establishing a first link between a source linking satellite of said plurality of non-geosynchronous satellites and said first communication terminal;
    establishing a second link between a destination linking satellite of said plurality of non-geosynchronous satellites and said second communication terminal; and
    wherein said maintaining step further comprises a step of handing-off said first link and said second link to other satellites in order to maintain said first dedicated path for said duration.

11. The method as claimed in claim 9, wherein said establishing step further comprises said steps of:
    establishing at least one crosslink to link a source linking satellite to a destination linking satellite; and
    wherein said maintaining step further comprises a step of relinquishing said at least one crosslink and establishing other crosslinks in order to maintain said first dedicated path for said duration.

12. In a satellite communication system which comprises a plurality of non-geosynchronous satellites, a method for operating a satellite comprising said steps of:
    establishing a dedicated link between said satellite and a first communication terminal, said dedicated link being a first portion of a dedicated communication path between said first communication terminal and a second communication terminal, said dedicated communication path being a path which said satellite communication system maintains for a duration which exceeds a length of time of a first data transfer session between said first communication terminal and said second communication terminal;
    maintaining said dedicated link for at least a portion of said duration; and
    handing-off said dedicated link in order to continue maintenance of said dedicated link.

13. The method for operating said satellite as claimed in claim 12, further comprising said steps of:

establishing a second dedicated link between said satellite and a second satellite, said second dedicated link being a second portion of said dedicated communication path; and maintaining said second dedicated link for at least another portion of said duration.

14. The method for operating said satellite as claimed in claim 13, wherein said establishing step comprises said step of establishing a direct crosslink with said second satellite.

15. The method for operating said satellite as claimed in claim 13, wherein said establishing step comprises said step of establishing a bent-pipe link with said second satellite.

16. The method for operating said satellite as claimed in claim 12, further comprising said steps of:

establishing a second dedicated link between said satellite said second communication terminal, said second dedicated link being a second portion of said dedicated communication path; and maintaining said second dedicated link for at least another portion of said duration.

17. In a satellite communication system which comprises a plurality of non-geosynchronous satellites, a method for establishing communication paths between pairs of communication terminals, said method comprising said steps of:

a) determining a source communication terminal which will communicate over a first dedicated path with a destination communication terminal, wherein said first dedicated path is maintained for a duration which exceeds a length of time of a first data transfer session between said source communication terminal and said destination communication terminal;

b) determining a first hand-off schedule for said source communication terminal, said first hand-off schedule identifying a source-linking satellite in said plurality of non-geosynchronous satellites which will provide a first link of said first dedicated path, and subsequent satellites to which said source communication terminal will hand-off during said duration;

c) determining a second hand-off schedule for said destination communication terminal, said second hand-off schedule identifying a destination-linking satellite in said plurality of non-geosynchronous satellites which will provide a second link of said first dedicated path, and other subsequent satellites to which said destination communication terminal will hand-off during said duration; and d) handing-off said source communication terminal and said destination communication terminal according to said first hand-off schedule and said second hand-off schedule during at least a portion of said duration.

18. The method as claimed in claim 17, further comprising said steps of:

e) determining crosslink schedules identifying crosslinks to be maintained by said source-linking satellite and said destination-linking satellite during at least a portion of said duration; and f) sending said crosslink schedules to said source-linking satellite and said destination-linking satellite.

19. A satellite of a communication system, said satellite comprising:

a communication terminal interface which enables said satellite to communicate with at least one communication terminal; and a controller, coupled to said communication terminal interface, which maintains a link of a dedicated communication path between a source communication terminal and a destination communication terminal for at least a portion of a duration of said dedicated communication path, said dedicated communication path having said duration which exceeds a length of time of a first data transfer session between said source communication terminal and said destination communication terminal.

20. The satellite as claimed in claim 19, further comprising:

a memory device, coupled to said controller, which stores information describing hand-off and crosslink information necessary for said satellite to assist in said communication system's efforts to maintain said dedicated communication path for said duration.

21. A communication terminal of a communication system, said communication terminal comprising:

a satellite interface which enables said communication terminal to communicate with at least one satellite of said communication system; and a processor, coupled to said satellite interface, which supports a link of a dedicated communication path between said communication terminal and a second communication terminal for at least a portion of a duration of said dedicated communication path, said dedicated communication path having said duration which exceeds a length of time of a first data transfer session between said communication terminal and said second communication terminal.

* * * * *